(12) United States Patent
Nania

(10) Patent No.: US 12,428,075 B2
(45) Date of Patent: Sep. 30, 2025

(54) TRUCK UTILITY BED SYSTEM

(71) Applicant: Ford Global Technologies, LLC, Dearborn, MI (US)

(72) Inventor: Adrian Nania, Rochester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 379 days.

(21) Appl. No.: 18/103,560

(22) Filed: Jan. 31, 2023

(65) Prior Publication Data
US 2024/0253712 A1    Aug. 1, 2024

(51) Int. Cl.
*B62D 33/027* (2006.01)
*B60R 3/02* (2006.01)
*B62D 33/03* (2006.01)

(52) U.S. Cl.
CPC .......... *B62D 33/0273* (2013.01); *B60R 3/02* (2013.01); *B62D 33/03* (2013.01)

(58) Field of Classification Search
CPC .... B62D 33/02; B62D 33/0273; B62D 33/03; B62D 25/2054; B60P 3/40; B60R 3/02
USPC ... 296/26.11, 51, 57.1, 62, 184.1, 37.6, 39.2
See application file for complete search history.

(56) References Cited

U.S. PATENT DOCUMENTS

| | | | |
|---|---|---|---|
| 4,639,032 A * | 1/1987 | Barbour | B60R 3/02 296/62 |
| 5,743,589 A * | 4/1998 | Felker | B62D 33/0273 296/180.1 |
| 9,387,806 B2 | 7/2016 | Bzoza | |
| 9,862,430 B1 * | 1/2018 | Stojkovic | B62D 33/0273 |
| 9,994,263 B1 * | 6/2018 | Richter | B60P 1/435 |
| 10,131,384 B2 | 11/2018 | Raines et al. | |
| 2005/0088848 A1 | 4/2005 | Miller et al. | |
| 2005/0116492 A1 * | 6/2005 | Wiley | B62D 33/03 296/57.1 |
| 2006/0055194 A1 | 3/2006 | Reed | |
| 2006/0214449 A1 * | 9/2006 | Klusmeier | B62D 33/0273 296/26.11 |
| 2007/0236035 A1 | 10/2007 | Waldner | |
| 2009/0250962 A1 * | 10/2009 | Polewarczyk | B60P 7/14 296/57.1 |
| 2009/0309381 A1 * | 12/2009 | Nelson | B62D 33/0273 296/26.11 |

(Continued)

FOREIGN PATENT DOCUMENTS

EP    1215107 A1 *    6/2002    ............... B60P 3/40

*Primary Examiner* — Gregory A Blankenship
(74) *Attorney, Agent, or Firm* — Vichit Chea; Carlson, Gaskey & Olds, P.C.

(57) ABSTRACT

A vehicle utility bed system comprises a floor, first and second side walls extending up from opposing sides of the floor, and a rear wall mounted for pivoting movement relative to the floor. The rear wall is moveable between an upright position where the rear wall cooperates with the first and second side walls to enclose an end of a cargo bed area and an open position to allow access to the cargo bed area. The vehicle utility bed system further comprises an extender structure mounted for pivoting movement relative to the floor. The extender structure is movable between a stowed position where the extender structure is located within the floor and a deployed position where the extender structure increases a size of the cargo bed area when the rear wall is in the open position.

17 Claims, 10 Drawing Sheets

(56) References Cited

U.S. PATENT DOCUMENTS

| | | | | |
|---|---|---|---|---|
| 2012/0126564 | A1* | 5/2012 | Hausler | B62D 33/0273 |
| | | | | 296/57.1 |
| 2014/0203587 | A1* | 7/2014 | Krishnan | B60R 3/02 |
| | | | | 296/62 |
| 2017/0282979 | A1* | 10/2017 | Singer | B62D 21/14 |
| 2018/0015962 | A1* | 1/2018 | Spahn | B62D 33/0273 |
| 2021/0039722 | A1* | 2/2021 | Williamson | B62D 33/03 |
| 2022/0009417 | A1* | 1/2022 | Kim | B62D 33/0273 |
| 2022/0097608 | A1* | 3/2022 | Patterson | B62D 33/03 |
| 2022/0144351 | A1* | 5/2022 | Griffith | B62D 33/03 |
| 2022/0314861 | A1* | 10/2022 | Tyler | B62D 33/03 |
| 2023/0382306 | A1* | 11/2023 | Brick | B60R 3/02 |
| 2024/0253712 | A1* | 8/2024 | Nania | B62D 33/0273 |
| 2024/0308596 | A1* | 9/2024 | Nania | B62D 33/0273 |

* cited by examiner

TRUCK UTILITY BED SYSTEM

TECHNICAL FIELD

This disclosure relates generally to a utility bed system for a vehicle and, more particularly, to a truck bed extender system that is foldable within a truck bed floor surface and provides multiple functions.

BACKGROUND

Vehicles transport various types of cargo. Vehicle cargo beds, such as in a pick-up truck for example, can vary in size. As passenger cabin size increases, cargo bed size may decrease. This may make it challenging to transport larger items.

SUMMARY

In some aspects, the techniques described herein relate to a vehicle utility bed system, including: a floor; first and second side walls extending up from opposing sides of the floor; a rear wall mounted for pivoting movement relative to the floor, wherein the rear wall is moveable between an upright position where the rear wall cooperates with the first and second side walls to enclose an end of a cargo bed area and an open position to allow access to the cargo bed area; and
  an extender structure mounted for pivoting movement relative to the floor and which is movable between a stowed position where the extender structure is located within the floor and a deployed position where the extender structure increases a size of the cargo bed area when the rear wall is in the open position.

In some aspects, the techniques described herein relate to a vehicle utility bed system, wherein the extender structure comprises a cover panel and a step panel that is pivotally mounted to the cover panel, wherein when the rear wall is in the open position, the cover panel overlaps the rear wall and the step panel is pivoted to a step deployed position to provide a step to be used by a user to step into the cargo bed area.

In some aspects, the techniques described herein relate to a vehicle utility bed system including a notch formed with a distal edge of the rear wall, and wherein, when the rear wall is in the upright position, the notch comprises a recessed area to receive cargo that extends outwardly beyond the rear wall, and wherein, when the rear wall is in the open position, the notch receives the step panel when in the step deployed position.

In some aspects, the techniques described herein relate to a vehicle utility bed system, wherein the cover panel includes a first side that faces upwardly when in the stowed position and a second side that faces downwardly when in the stowed position, and wherein the step panel fits within a recess in the first side of the cover panel when the step panel is in a step stowed position, and wherein the cover panel includes at least one load stop panel that is pivotally mounted to the second side of the cover panel and is selectively deployed to an upright position to provide a stop surface when the rear wall is in the open position.

In some aspects, the techniques described herein relate to a vehicle utility bed system, wherein the at least one load stop panel includes at least one grab handle configured to be gripped by a user when the step panel is in the step deployed position and the at least one load stop panel is in the upright position.

In some aspects, the techniques described herein relate to a vehicle utility bed system, wherein, when the at least one load stop panel is in the upright position, an extended bed area is provided that extends beyond rearmost ends of the first and second side walls, and wherein the cover panel further includes a first side panel that pivots to extend between the cover panel and a rearmost end of the first side wall and a second side panel that pivots to extend between the cover panel and a rearmost end of the second side wall.

In some aspects, the techniques described herein relate to a vehicle utility bed system, wherein the step panel is movable to an upright position to align with the at least one load stop panel when the at least one load stop panel is in the upright position such that the extended bed area is defined with an area surrounded by the step panel, the at least one load stop panel, and the first and second side panels.

In some aspects, the techniques described herein relate to a vehicle utility bed system, wherein the at least one load stop panel comprises at least a first load stop panel positioned on one side of the step panel and a second load stop panel positioned on an opposite side of the step panel, and wherein each of the first load stop panel and the second load stop panel is selectively deployed to an upright position to provide a stop surface when the rear wall is in the open position.

In some aspects, the techniques described herein relate to a vehicle utility bed system, wherein, when the step panel and the first and second load stop panels are in the upright position, an extended bed area is provided that extends beyond rearmost ends of the first and second side walls, and wherein the cover panel further includes a first side panel that pivots to extend between the first load stop panel and a rearmost end of the first side wall and a second side panel that pivots to extend between the second load stop panel and a rearmost end of the second side wall such that the extended bed area is defined with an area surrounded by the step panel, the first and second load stop panels, and the first and second side panels.

In some aspects, the techniques described herein relate to a vehicle utility bed system, wherein the extender structure comprises a cover panel, and wherein, when the rear wall is in the upright position, the cover panel is pivoted to an upright position to overlap the rear wall to provide a recessed area with the floor.

In some aspects, the techniques described herein relate to a vehicle utility bed system, wherein the extender structure comprises a cover panel, and wherein, when the rear wall is in the open position, the cover panel overlaps the rear wall to provide a generally flat work surface.

In some aspects, the techniques described herein relate to a vehicle utility bed system, including: a floor having a laterally extending width and a longitudinally extending length; first and second side walls extending in a longitudinal direction along opposing sides of the floor; a front wall extending in a lateral direction along a fore end of the floor; a tailgate extending in the lateral direction along an aft end of the floor, wherein the tailgate is mounted for pivoting movement relative to the floor to move between an upright position where the tailgate cooperates with the front wall and the first and second side walls to define a cargo bed area and an open position to allow access to the cargo bed area; and a cover panel mounted for pivoting movement relative to the floor, wherein the cover panel is movable between a stowed position where the cover panel is received within a recessed area in the floor and a deployed position where the cover panel increases a size of the cargo bed area when the tailgate is in the open position.

In some aspects, the techniques described herein relate to a vehicle utility bed system including a step panel that is pivotally mounted to the cover panel, wherein when the tailgate is in the open position, the cover panel overlaps the tailgate and the step panel is pivoted to a step deployed position to provide a step to be used by a user to step into the cargo bed area.

In some aspects, the techniques described herein relate to a vehicle utility bed system, wherein the cover panel includes a first side that faces upwardly when in the stowed position and a second side that faces downwardly when in the stowed position, and wherein the step panel fits within a recess in the first side of the cover panel when the step panel is in a step stowed position, and wherein the cover panel includes at least one load stop panel that is pivotally mounted to the second side of the cover panel and is selectively deployed to an upright position to provide a stop surface when the tailgate is in the open position.

In some aspects, the techniques described herein relate to a vehicle utility bed system, wherein, when the at least one load stop panel is in the upright position, an extended bed area is provided that extends beyond rearmost ends of the first and second side walls, and wherein the cover panel further includes a first side panel that pivots to extend between the cover panel and a rearmost end of the first side wall and a second side panel that pivots to extend between the cover panel and a rearmost end of the second side wall.

In some aspects, the techniques described herein relate to a vehicle utility bed system, wherein the step panel is movable to an upright position to align with the at least one load stop panel when the at least one load stop panel is in the upright position such that the extended bed area is defined with an area surrounded by the step panel, the at least one load stop panel, and the first and second side panels.

In some aspects, the techniques described herein relate to a vehicle utility bed system, wherein, when the tailgate is in the upright position, the cover panel is pivoted to an upright position to overlap the rear wall to provide access to the recessed area within the floor, and wherein, when the tailgate is in the open position, the cover panel overlaps the tailgate to provide a generally flat work surface.

In some aspects, the techniques described herein relate to a method, including: providing a floor, first and second side walls extending up from opposing sides of the floor, and a rear wall mounted for pivoting movement relative to the floor, wherein the rear wall is moveable between an upright position where the rear wall cooperates with the first and second side walls to enclose an end of a cargo bed area and an open position to allow access to the cargo bed area; and
  mounting an extender structure for pivoting movement relative to the floor such that the extender structure is movable between a stowed position where the extender structure is located within the floor and a deployed position where the extender structure increases a size of the cargo bed area when the rear wall is in the open position.

In some aspects, the techniques described herein relate to a method, wherein the extender structure comprises a cover panel and a step panel that is pivotally mounted to the cover panel, and including: pivoting the rear wall to the open position such that the cover panel overlaps the rear wall; and pivoting the step panel to a step deployed position to provide a step to be used by a user to step into the cargo bed area.

In some aspects, the techniques described herein relate to a method, wherein the cover panel includes a first side that faces upwardly when in the stowed position and a second side that faces downwardly when in the stowed position, and including: fitting the step panel within a recess in the first side of the cover panel when the step panel is in a step stowed position; pivotally mounting at least one load stop panel to the second side of the cover panel; pivoting the step panel to an upright position; and selectively deploying the at least one load stop panel to an upright position to align with the step panel and provide an extended bed area.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a utility bed system for a vehicle and, more particularly, to a truck bed extender system that is foldable within a truck bed floor surface and provides multiple functions. In one example, the vehicle comprises a truck; however, the bed extender system could also be used in other vehicles such as passenger cars, sport utility vehicles, vans, etc.

Figure 1:
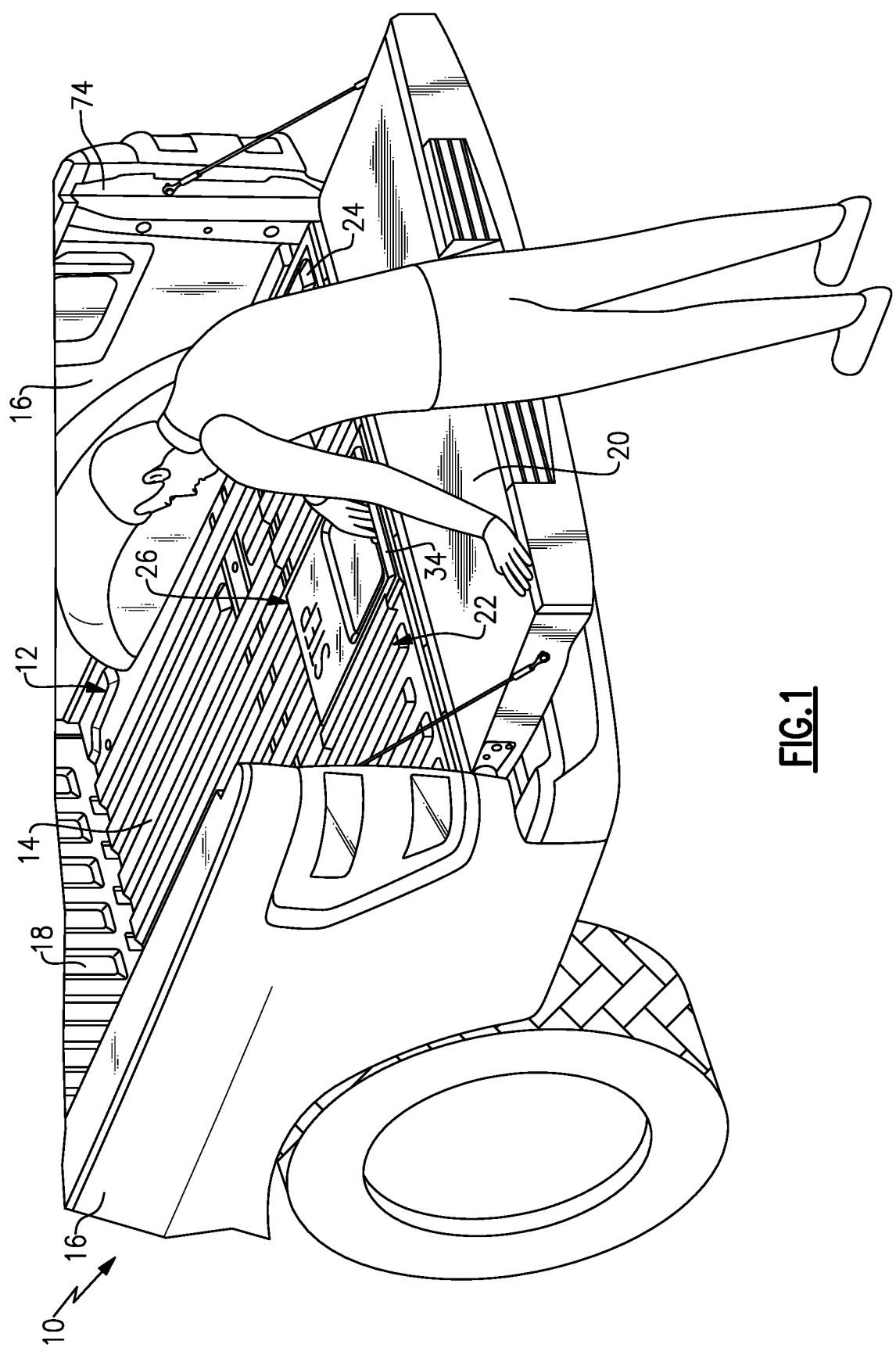
FIG. 1 illustrates a perspective view of a truck bed with a tailgate in a lowered position and a bed extender in a stowed position.

With reference to FIG. 1, a vehicle 10 has a bed 12 with a floor 14, side walls 16, a forward wall 18 extending along a fore edge of the floor 14, and a rear wall or tailgate 20 that cooperate with each other to define an open cargo area. The vehicle 10 has a bed extender structure 22 that is moveable between a deployed position and a stowed position where the structure 22 is stored in the bed floor 14 until it is needed. In the stowed position, the bed extender structure 22 is generally flush with, e.g. aligned with, the bed floor 14 such that any cargo in the cargo area can be easily slid in and out of the bed 12 without any interference. Once fully deployed, the bed extender structure 22 serves as a bed extender to increase cargo space but also has additional functions.

The tailgate 20 is movable between an upright position where the tailgate 20 cooperates with the first and second side walls 16 to enclose an end of the cargo bed area (FIG. 5), and a lowered position or open position, as shown in FIG. 1, to allow access to the cargo bed area. In one example, the bed extender structure 22 comprises a cover panel 24 that is movable between a stowed position where the cover panel 24 is generally flush with the floor 14 and a deployed position. In a fully deployed position, the cover panel 24 increases a size of the cargo bed area. The cover panel 24 includes a plurality of sub-panels that can be selectively deployed to provide multiple functions.

Figure 2:
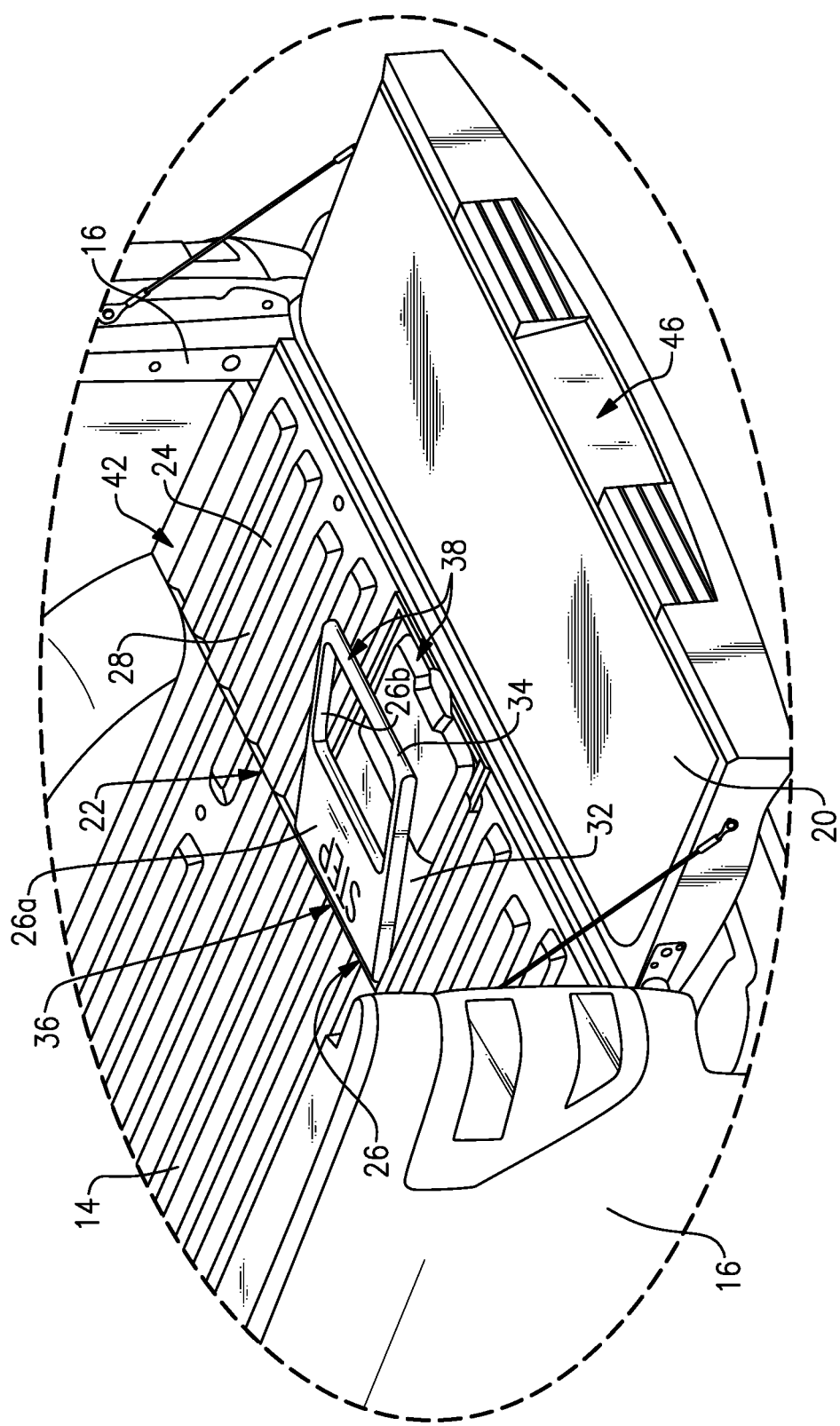
FIG. 2 is a perspective view of the bed extender comprising a cover panel with a step panel being moved to a deployed position.
Figure 3:
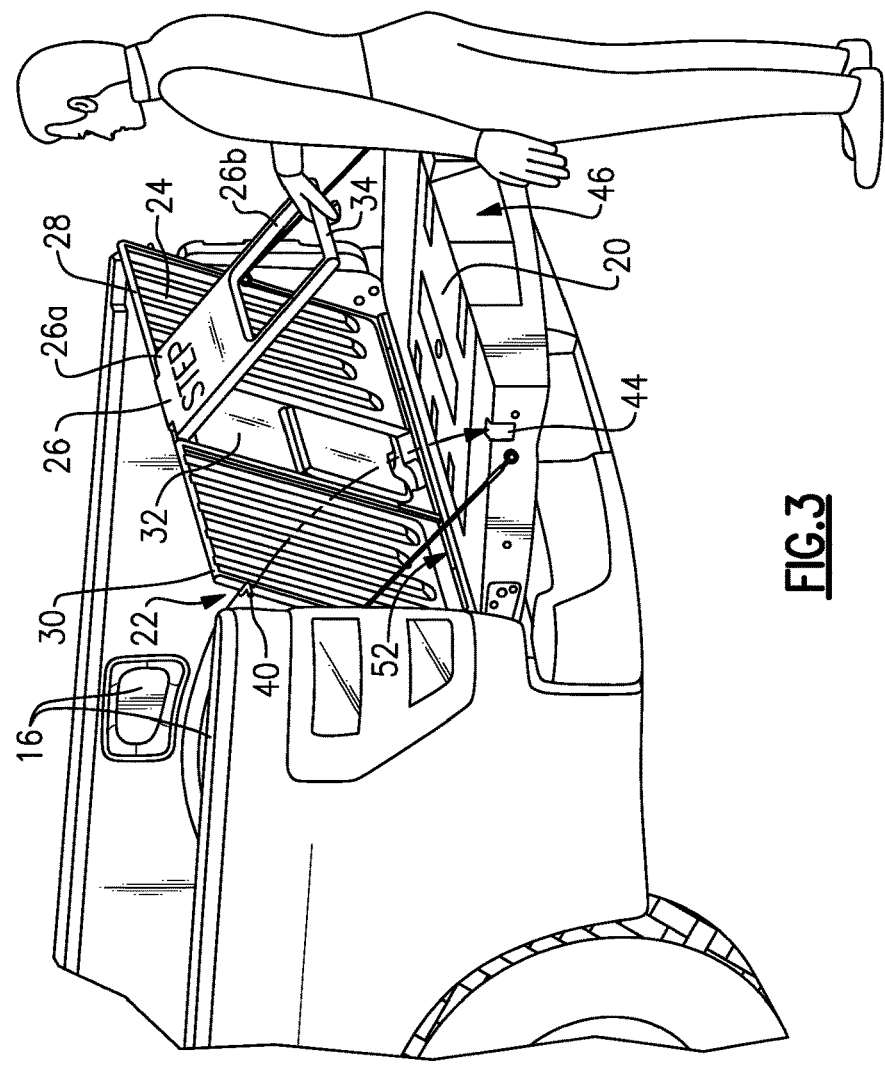
FIG. 3 is similar to FIG. 2 but shows the step panel being used to rotate the cover panel to a deployed position.

In one example, the cover panel 24 includes a step panel 26 that is pivotally mounted to the cover panel 24 as shown in FIG. 2. The cover panel 24 has first surface 28 that faces upwardly when in the stowed position and a second surface 30 (FIG. 3) that faces downwardly when in the stowed position. As shown in FIG. 2, the first surface 28 includes a recessed area 32 that receives the step panel 26. The step panel 26 comprises a generally solid upper portion 26a, an open lower portion 26b, and at least one rung or step rod 34 that bounds the open lower portion 26b. In one example, the upper portion 26a is pivotally coupled to the cover panel 24 as indicated at 36. In one example, a spring-loaded catch (not shown) secures the cover panel 24 to the floor 14. In one example, to initiate movement of the cover panel 24 to the deployed position, the step panel 26 is pivoted upwardly (FIG. 2) by grasping the step rod 34, which has an interference fit in a cradle area 38 of the recessed area 32. Thus, the step rod 34 also serves as a handle or grab bar, and rotating the step panel 26 via the handle releases the spring-loaded catch, which in turn allows the cover panel 24 to be rotated upwardly.

Figure 4:
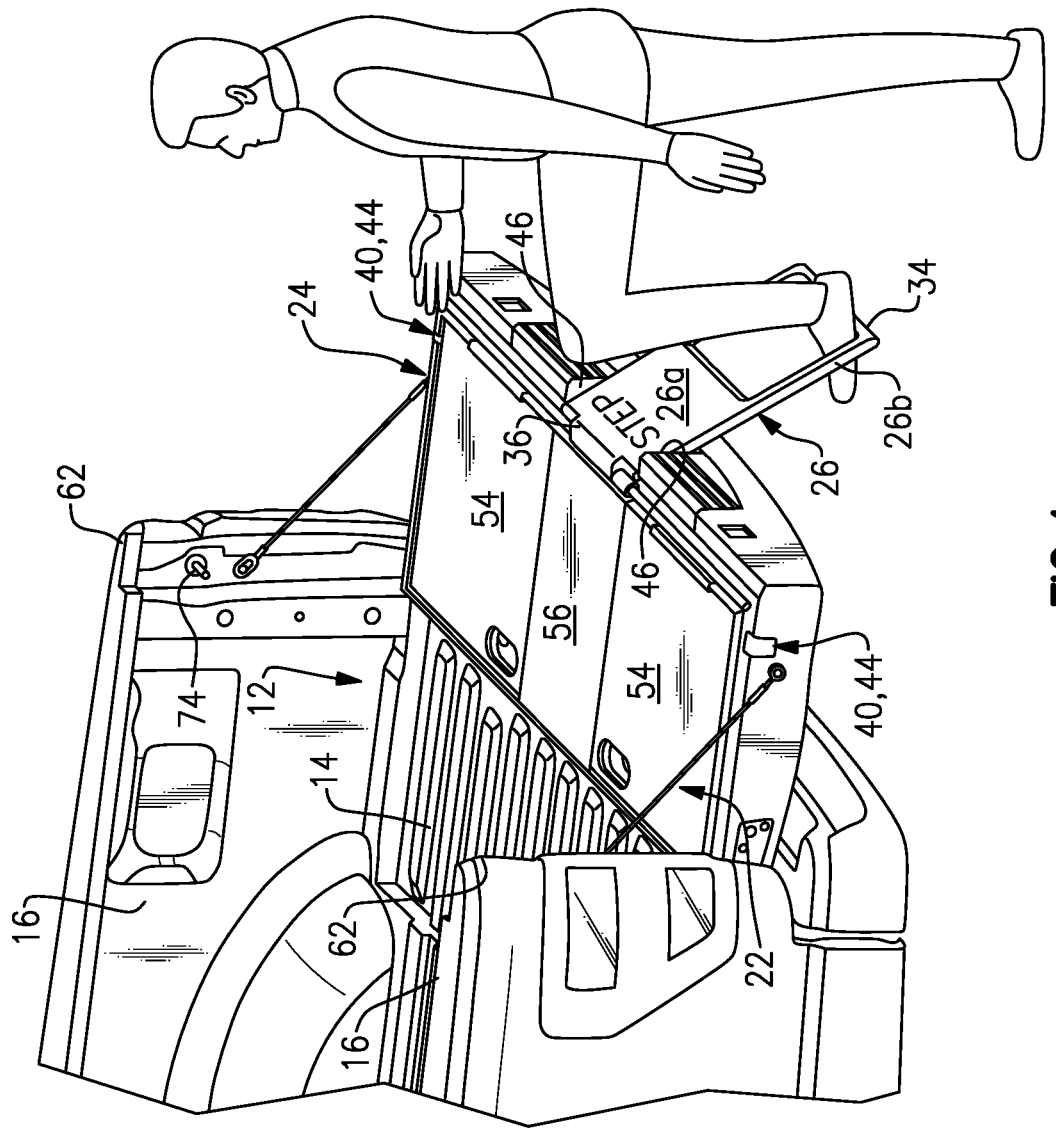
FIG. 4 is similar to FIG. 2 but shows the step panel in a fully deployed position.

In one example, the cover panel 24 includes striker pins 40 that extend laterally outwardly from opposing edges of the cover panel 24. When the cover panel 24 is in the stowed position, the striker pins 40 contact rubber bumper areas 42 (FIG. 2) to provide noise, vibration, harshness (NVH) isolation. To move the cover panel 24 to the deployed position, the cover panel 24 rotates about a hinge as indicated at 52. In one example, the hinge comprises a piano style hinge. When the cover panel 24 is in the deployed position where the cover panel 24 overlaps the tailgate 20 as shown in FIG. 4, the striker pins 40 engage existing power auto cinch latches 44 (FIG. 3), which serve to retain the cover panel 24 fixed to the tailgate 20. To unlatch the cover panel 24 from the tailgate 20, the user would push a tailgate open button (not shown).

Once the cover panel 24 is fixed to the tailgate 20, the step panel 26 is pivoted to a step deployed position (FIG. 4) to provide a step to be used by a user to step into the cargo bed area while the vehicle is stationary. In one example, to facilitate easy stepping into the cargo bed 12, the step panel 26 extends at a non-perpendicular angle relative to the tailgate 20 when the tailgate 20 is in the lowered position. In one example, the upper portion 26a of the step panel 26 is received within a notch 46 formed in an upper edge of the tailgate 20. In one example, the notch 46 further comprises an angled surface 64 (FIG. 10) the defines the angle of deployment for the step panel 26 when the step panel 26 is in the step deployed position. Further, the notch 46 facilitates secure holding of the step panel 26 in the step deployed position. In this position, the step rod 34 is spaced apart from ground level by a distance that allows the user to easily step on the rod 34 and then step into the truck bed 12.

Figure 5:
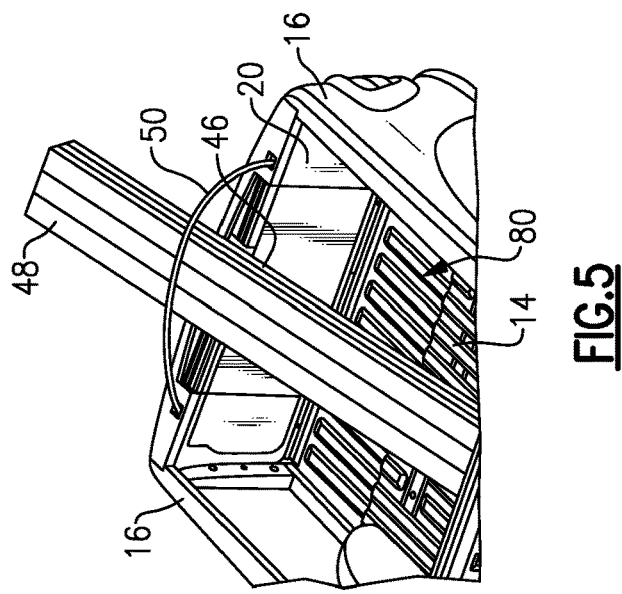
FIG. 5 is a perspective view of the tailgate in an upright position with extended cargo being secured within a notch formed in an upper edge of the tailgate.

The notch 46 also has a secondary function. As shown in FIG. 5, when the tailgate 20 is in the upright position, the notch 46 comprises a recessed area to receive cargo 48 that extends outwardly beyond the tailgate 20. This facilitates the transport of longer cargo 48, such as lumber, piping, ladders, etc. The cargo 48 fits within the notch 46 to prevent lateral sliding movement of the cargo 48 during transport. In one example, a tie-down or strap 50 can additionally be employed to securely hold the cargo 48 in place.

Figure 7:
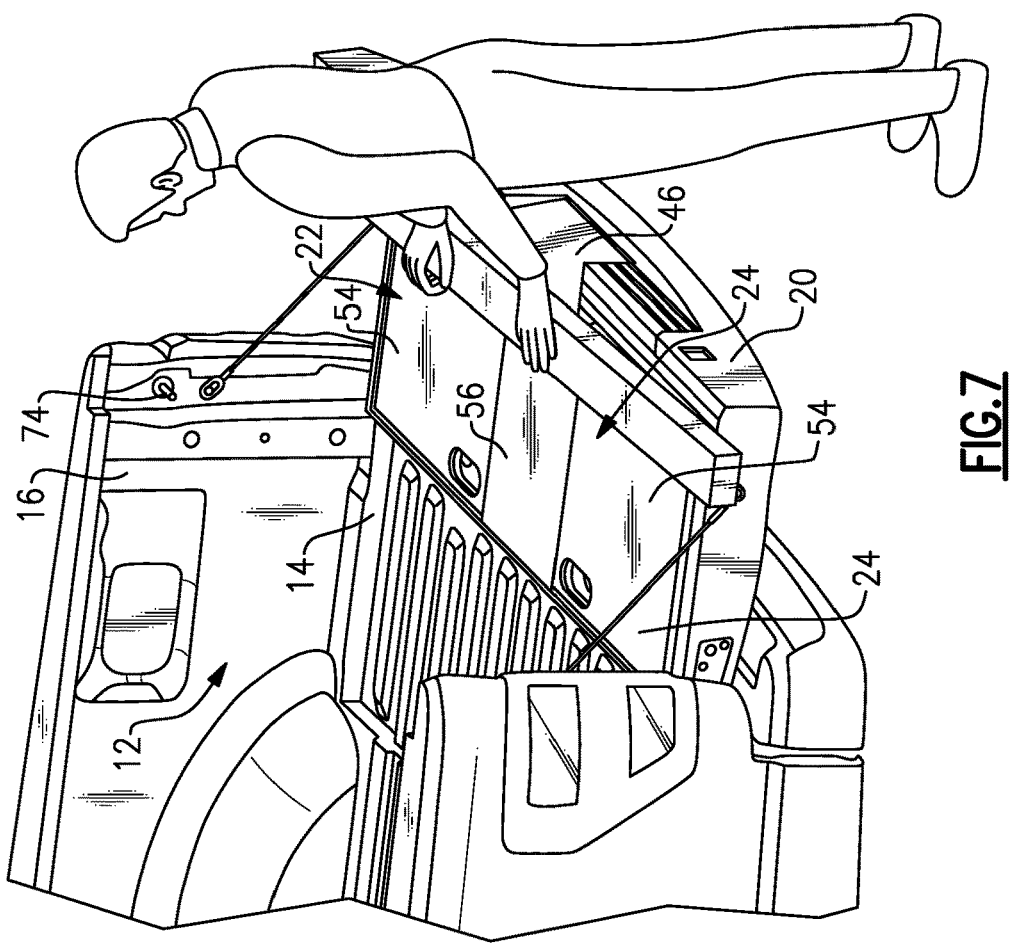
FIG. 7 is similar to FIG. 6 but showing the cover panel covering the tailgate to provide a generally flat work surface.
Figure 6:
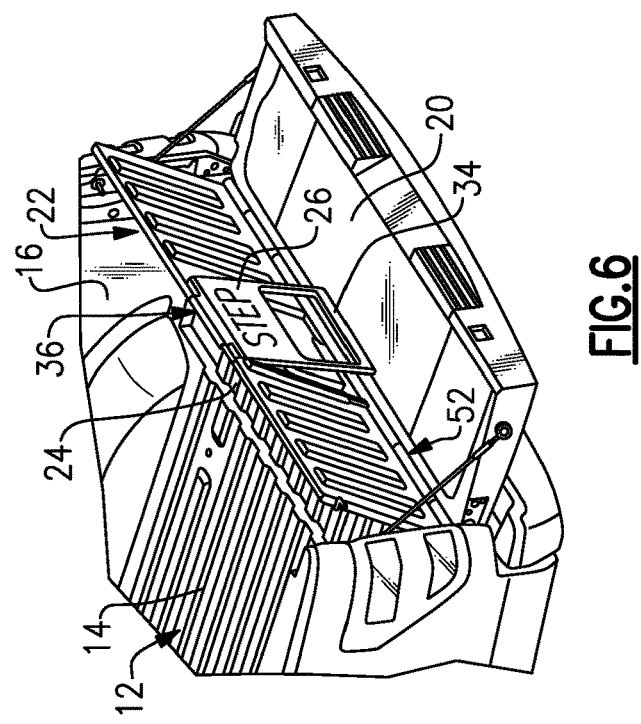
FIG. 6 is a view similar to FIG. 4 but shows the step panel being moved to a hidden position between the cover panel and the tailgate.

FIG. 6 shows the step panel 26 being rotated to fit back within the recessed area 32 before the cover panel 24 is rotated to latch to the lowered tailgate 20. In this configuration, the step panel 26 is located between the cover panel 24 and the tailgate 20, with the second surface 30 of the cover panel 24 now facing upwardly as shown in FIG. 7. The provides a generally flat work space for the user. There is unobstructed access to the work surface as the step panel 26 has been moved to a stowed position. This also allows the cover panel 24 to cover any unsightly wear and tear markings on an inner surface of the tailgate 20, while also protecting the tailgate surface from any additional markings. In one example, the tailgate 20 cannot be closed while the work surface is deployed, e.g. closure is prevented via mechanical or electrical lock out.

As shown in FIG. 7, the work surface is comprised of a plurality of panels. In one example, there is at least one load stop wall panel 54 and an additional panel 56 that is positioned opposite from the step panel 26. In the shown example, there are at least two load stop wall panels 54 and the additional panel 56 is positioned directly between the two load stop wall panels 54. Other configurations with additional panels are also contemplated.

Figure 8:
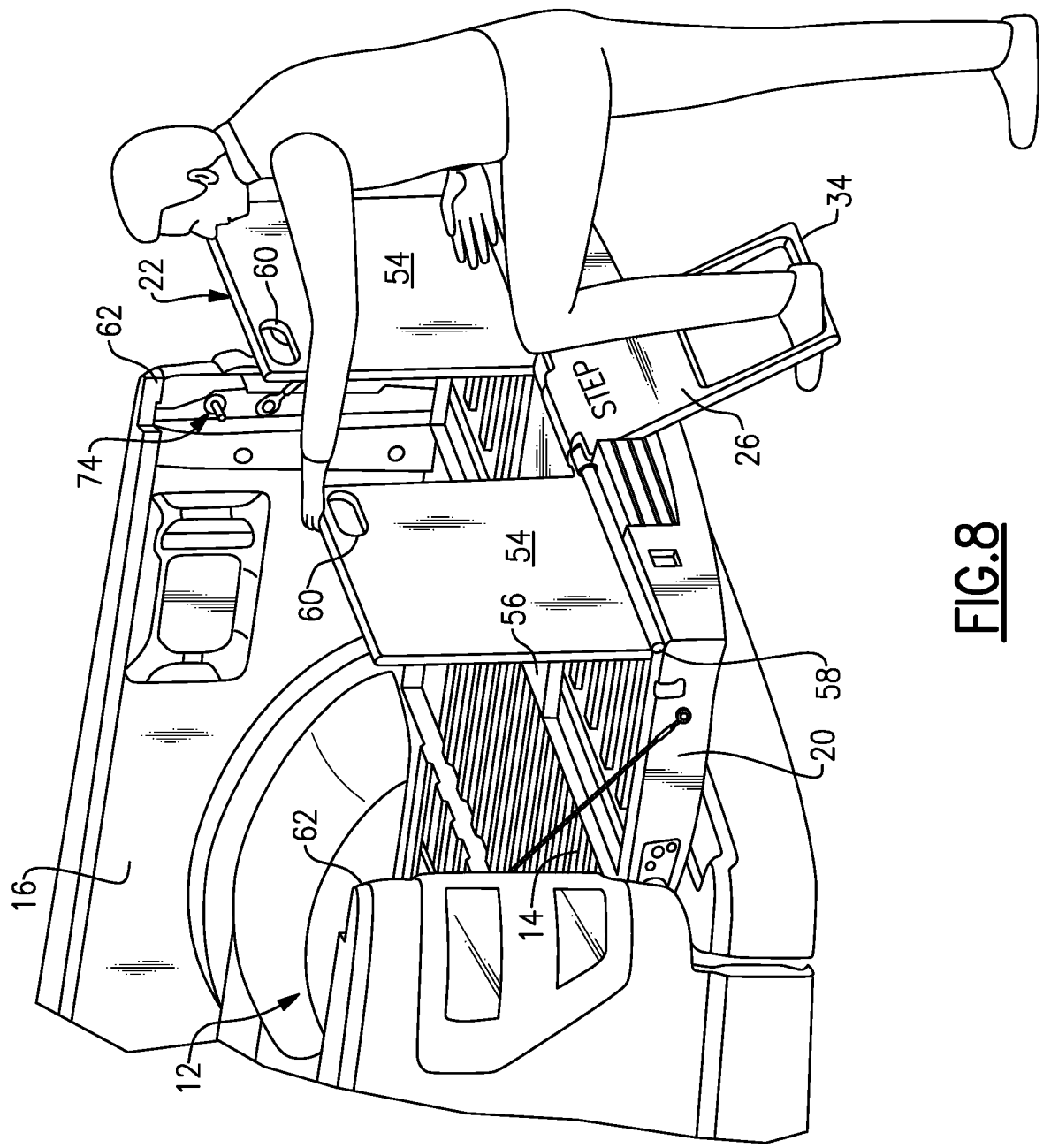
FIG. 8 is a perspective view of the tailgate in the lowered position with the step panel in the fully deployed position and with two load stop panels in a deployed position.

FIG. 8 shows one example configuration where the step panel 26 is in the step deployed position and the load stop wall panels 54 are in the deployed position. A first load stop wall panel 54 is positioned on one side of the step panel 26 and a second load stop wall panel 54 positioned on an opposite side of the step panel 26. Each of the first and second load stop wall panels 54 are selectively deployable to an upright position to provide a stop surface when the tailgate 20 is in the open or lowered position. The load stop wall panels 54 are pivotally mounted to the second side 30 of the cover panel 24 as indicated at 58. Only one load stop wall panel 54 could be deployed or both load stop wall panels 54 could be deployed depending upon the desired use and function. When the load stop wall panels 54 are in the upright position, an extended bed area is provided that extends beyond rearmost ends 62 of the first and second side walls 16.

In one example, at least one of the load stop wall panels 54 includes at least one grab handle 60 configured to be gripped by the user when the step panel 26 is in the step deployed position and the associated load stop wall panel 54 is in the upright position. The use of the grab handles 60 helps the user enter (FIG. 8) and exit (FIG. 9) the truck bed 12.

Figure 9:
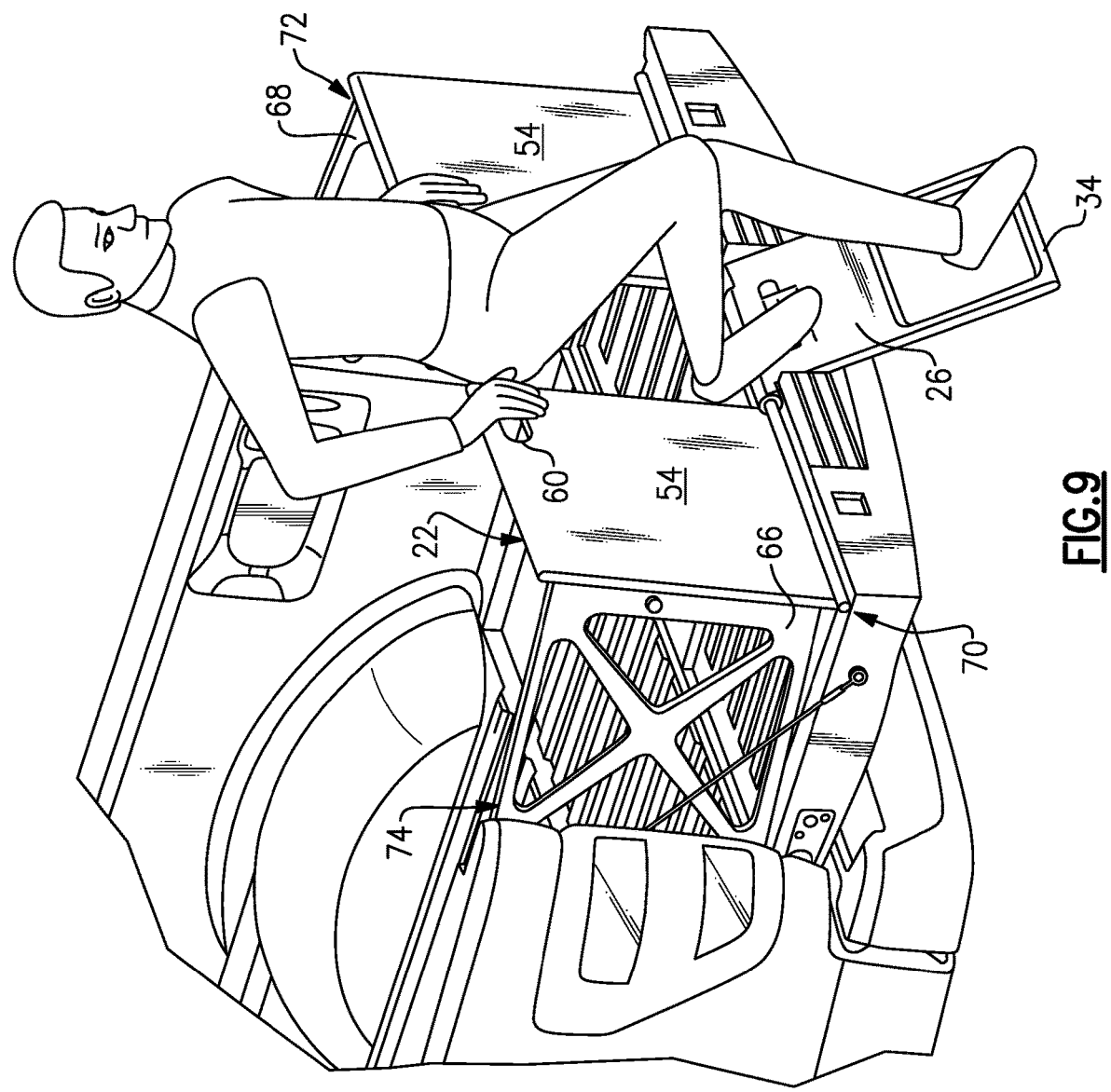
FIG. 9 is similar to FIG. 8 but shows two side panels in a deployed position.

In one example, the cover panel 24 further includes a first side panel 66 that pivots to extend between the cover panel 24 and the rearmost end 62 of one side wall 16 and a second side panel 68 that pivots to extend between the cover panel 24 and the rearmost end 62 of the other side wall 16 as shown in FIG. 9. In one example, the first side panel 66 is pivotally connected to one load stop wall panel 54 as indicated at 70, and the second side panel 68 is pivotally connected to the other load stop wall panel 54 as indicated at 72. The side panels 66, 68 provide additional beneficial features. The side panels 66, 68 provide for increased support for the load stop wall panels 54 and can be deployed and hooked into striker pins on the side walls 16 as indicated at 74. Additionally, the side panels 66, 68 help to provide closure at edges of the load stop wall panels 54 to further define a box-shaped enclosure structure. The side panels 66, 68 can include open areas as shown in FIG. 9 to reduce weight, or can comprise solid panels if further structural support is required.

Figure 10:
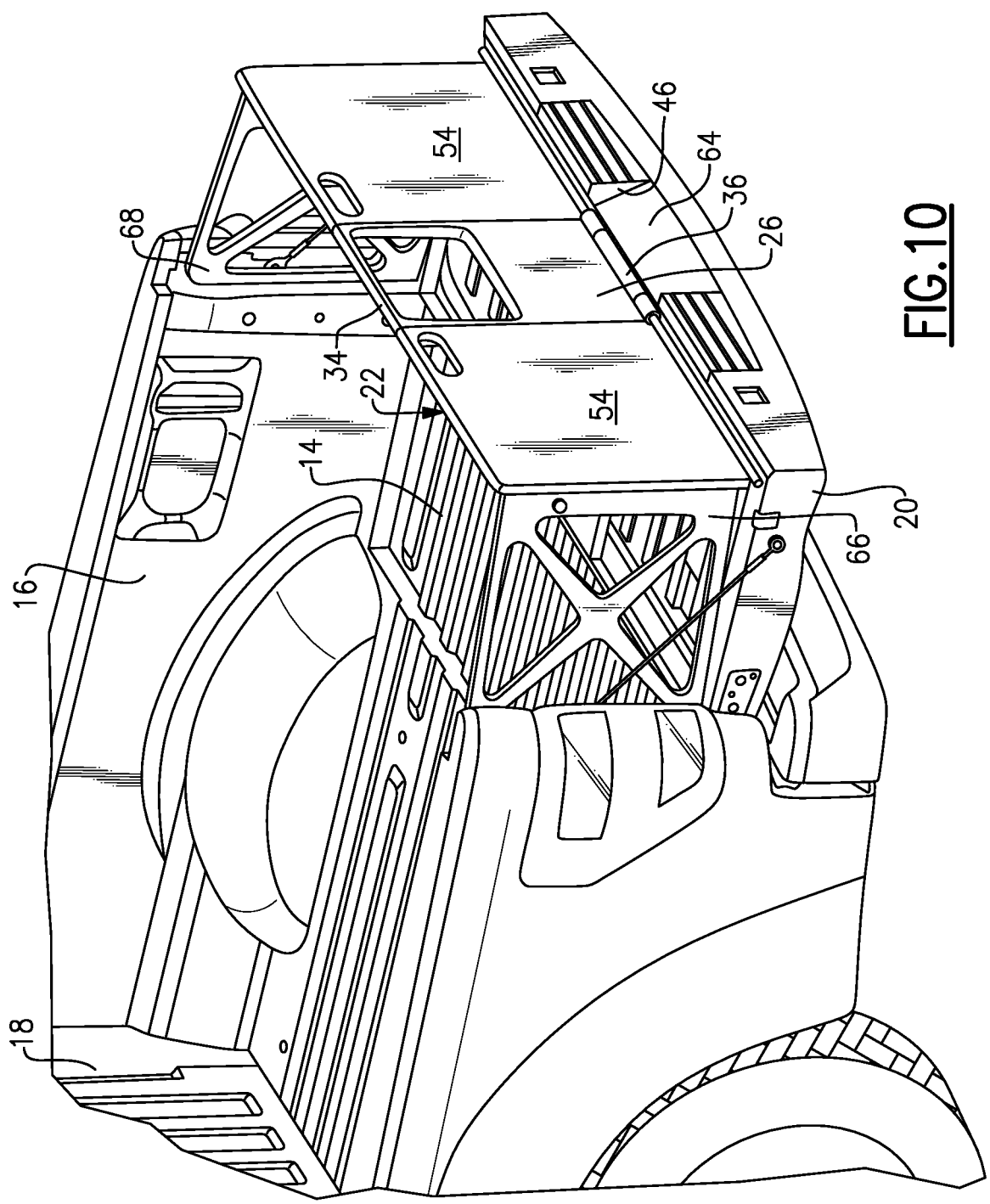
FIG. 10 is similar to FIG. 9 but shows the step panel in a position generally aligned with the two load stop panels to provide the bed extender.

FIG. 10 shows an example configuration where the extender structure 22 has all of the panels/walls arranged to provide an extended bed area that extends beyond the rearmost ends 62 of the side walls 16 of the truck bed 12. In this example, the step panel 26 is moved to an upright position to align with the load stop wall panels 54 when the load stop wall panels 54 are in the upright position. The side panels 66, 68 are also in the deployed position such that the extended bed area is defined with an area surrounded by the step panel 26, the load stop wall panels 54, and the first and second side panels 66, 68. This allows the vehicle 10 to transport additional cargo or larger cargo that would not be able to be transported without the extender structure 22.

Figure 11:
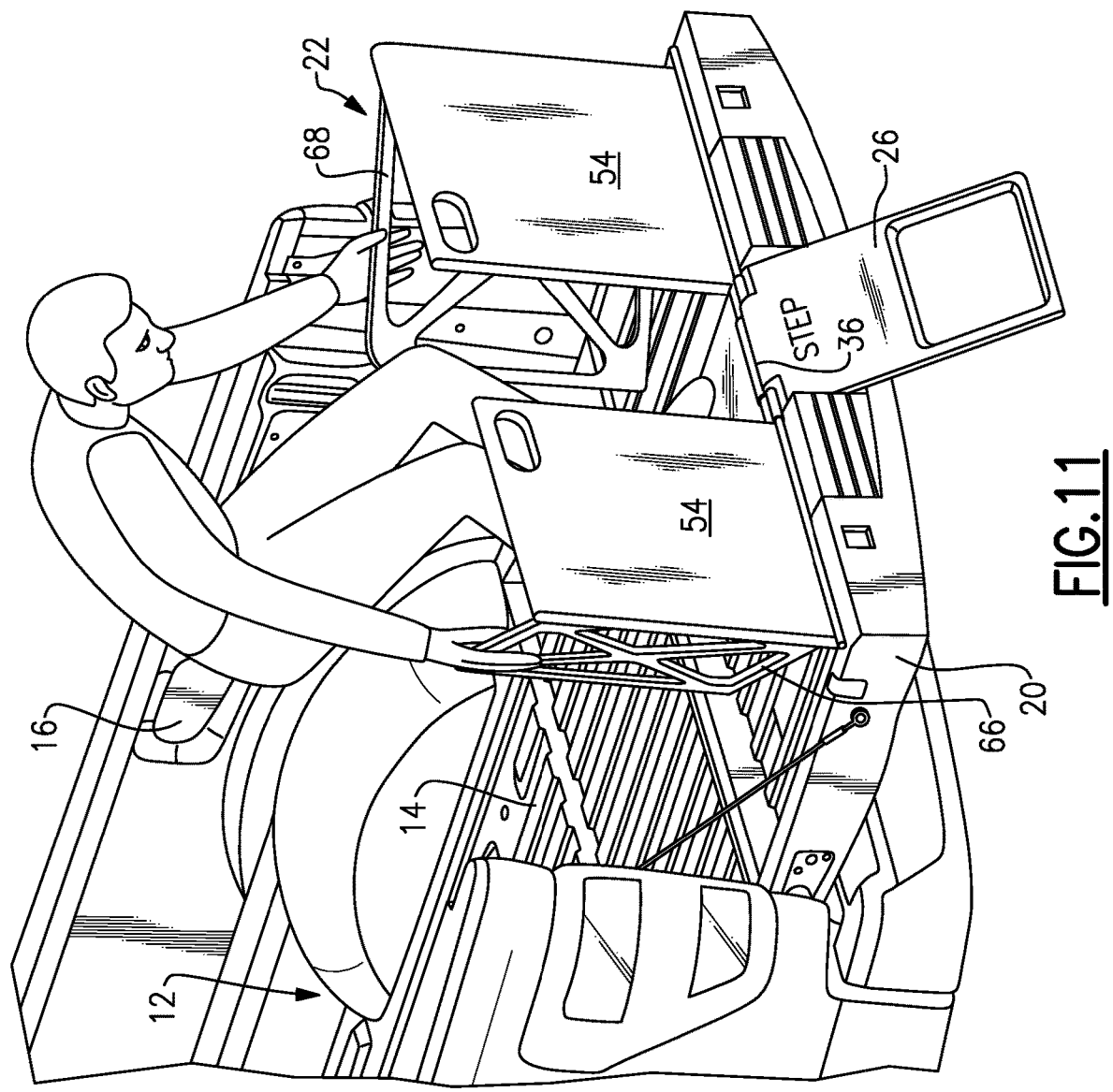
FIG. 11 is similar to FIG. 9 but shows the two side panels being rotated to a stowed position.
Figure 12:
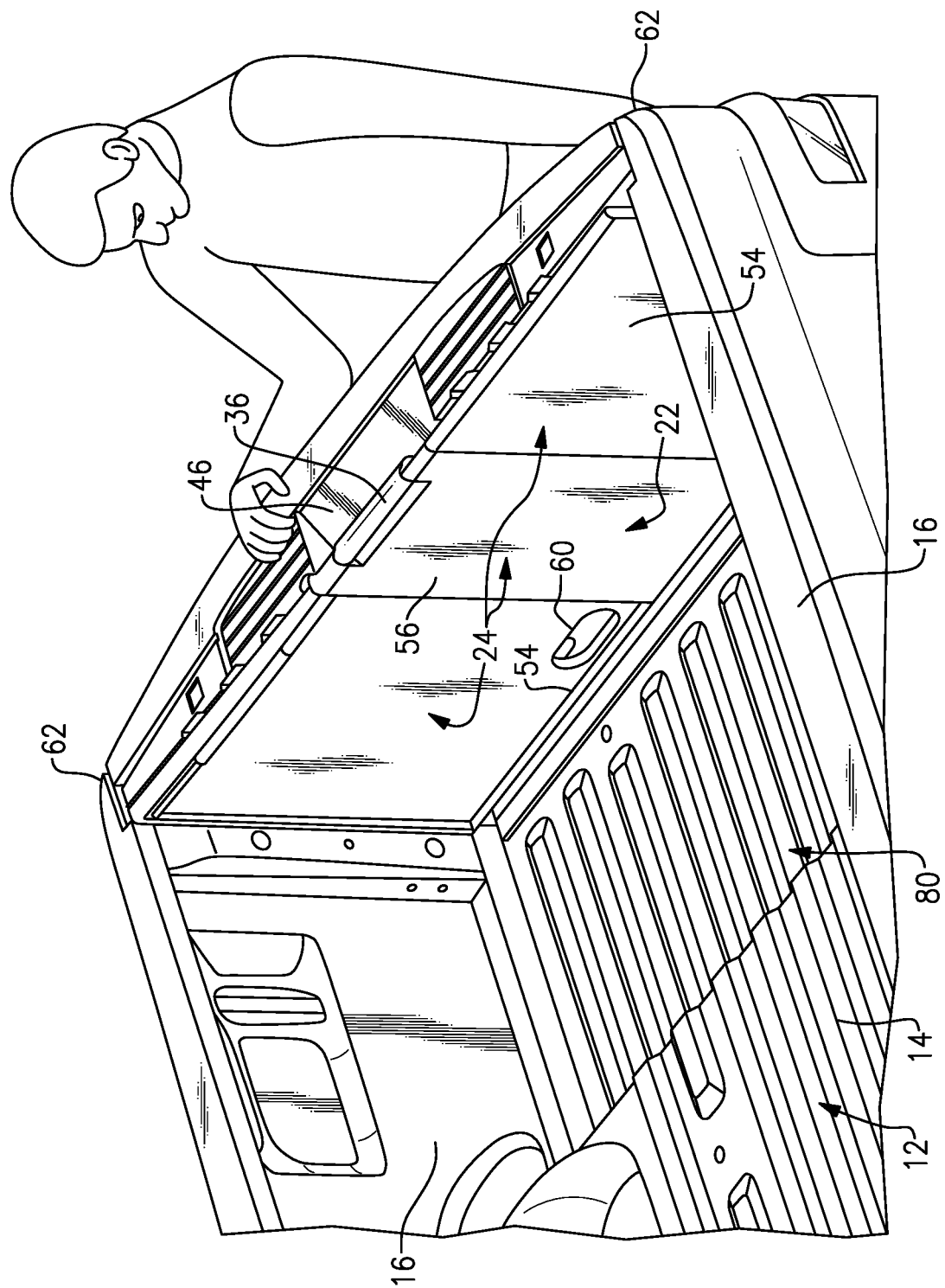
FIG. 12 is a perspective view of the tailgate in the upright position with the cover panel in an upright position to provide additional vertical cargo space.

To stow the extender structure 22, the side panels 66, 68 are unlatched and pivoted to a stowed position where the panels 66, 68 overlap the associated load stop wall panel 54 as shown in FIG. 11. The load stop wall panels 54 and the step panel 26 are the rotated to the stowed position (FIG. 7). The extender structure 22 can then be unlatched from the tailgate 20 and pivoted to the stowed position (FIG. 1) where the extender structure 22 is received within a recessed area 80 (FIG. 12) formed in the floor 14.

In one example, when the tailgate 20 is in the upright position, the extender structure 22 is released from the floor 14 and pivoted to an upright position to overlap the tailgate 20. This provides open access to the recessed area 80 within the floor 14 and increases a vertical height of at least a portion of the cargo bed area.

In one example, a method of operating the bed extender structure 22 includes first lowering the tailgate 20 such that the bed extender 22 can be accessed. The method includes forming the bed extender 22 to comprise a cover panel 24 that is rotated by gripping the step rod 34 on an associated step panel 26 that is coupled to the cover panel 24. The step rod 34 additionally comprises a step support that is rotated away from the cover panel 24 and is supported within a notch 46 formed in the tailgate 20 to provide a step up function. With the step panel 26 in the deployed or stowed positions, load stop walls/panels 54 can be rotated upwardly to provide load stops to prevent cargo from sliding out of the bed 12. Side panels 66, 68 can also be rotated to generally align with an inner surface of the side walls 16 of the bed 12 to close in the sides of the bed extender. The step panel 26 can then be rotated to the upright position to complete the enclosure and create the extended bed area. In one example, the method further includes pivoting the step panel 26, the side walls 66, 68, and the load stop walls 54 to the stowed position to create a work surface on the tailgate 20.

The subject disclosure provides a bed extender structure 22 that is moveable between a deployed position and a stowed position where the structure 22 is stored in the bed floor 14 until the structure 22 is needed. Once deployed, the structure 22 provides an extended cargo bed area enclosed by load stop walls 54 and side panels 66, 68, but also has additional functions. The bed extender structure 22 provides a step-up function via a step panel 26 when the tailgate 20 is lowered, as well as providing a load retainer function for extended length cargo when the tailgate 20 is upright. Additionally, the bed extender structure 22 can provide an aesthetically pleasing and generally flat work surface when the tailgate 20 is lowered.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A vehicle utility bed system comprising:
a floor;
first and second side walls extending up from opposing sides of the floor;
a rear wall mounted for pivoting movement relative to the floor, wherein the rear wall is moveable between an upright position where the rear wall cooperates with the first and second side walls to enclose an end of a cargo bed area and an open position to allow access to the cargo bed area;
an extender structure mounted for pivoting movement relative to the floor and which is movable between a stowed position where the extender structure is located within the floor and a deployed position where the extender structure increases a size of the cargo bed area when the rear wall is in the open position; and
wherein the extender structure comprises a cover panel and a step panel that is pivotally mounted to the cover panel, wherein when the rear wall is in the open position, the cover panel overlaps the rear wall and the step panel is pivoted to a step deployed position to provide a step to be used by a user to step into the cargo bed area.

2. The vehicle utility bed system of claim 1, including a notch formed with a distal edge of the rear wall, and wherein, when the rear wall is in the upright position, the notch comprises a recessed area to receive cargo that extends outwardly beyond the rear wall, and wherein, when the rear wall is in the open position, the notch receives the step panel when in the step deployed position.

3. The vehicle utility bed system of claim 1, wherein the cover panel includes a first side that faces upwardly when in the stowed position and a second side that faces downwardly when in the stowed position, and wherein the step panel fits within a recess in the first side of the cover panel when the step panel is in a step stowed position, and wherein the cover panel includes at least one load stop panel that is pivotally mounted to the second side of the cover panel and is selectively deployed to an upright position to provide a stop surface when the rear wall is in the open position.

4. The vehicle utility bed system of claim 3, wherein the at least one load stop panel includes at least one grab handle configured to be gripped by a user when the step panel is in the step deployed position and the at least one load stop panel is in the upright position.

5. The vehicle utility bed system of claim 3, wherein, when the at least one load stop panel is in the upright position, an extended bed area is provided that extends beyond rearmost ends of the first and second side walls, and wherein the cover panel further includes a first side panel that pivots to extend between the cover panel and a rearmost end of the first side wall and a second side panel that pivots to extend between the cover panel and a rearmost end of the second side wall.

6. The vehicle utility bed system of claim 5, wherein the step panel is movable to an upright position to align with the at least one load stop panel when the at least one load stop panel is in the upright position such that the extended bed area is defined with an area surrounded by the step panel, the at least one load stop panel, and the first and second side panels.

7. The vehicle utility bed system of claim 3, wherein the at least one load stop panel comprises at least a first load stop panel positioned on one side of the step panel and a second load stop panel positioned on an opposite side of the step panel, and wherein each of the first load stop panel and the second load stop panel is selectively deployed to an upright position to provide a stop surface when the rear wall is in the open position.

8. The vehicle utility bed system of claim 7, wherein, when the step panel and the first and second load stop panels are in the upright position, an extended bed area is provided that extends beyond rearmost ends of the first and second side walls, and wherein the cover panel further includes a first side panel that pivots to extend between the first load stop panel and a rearmost end of the first side wall and a second side panel that pivots to extend between the second load stop panel and a rearmost end of the second side wall such that the extended bed area is defined with an area surrounded by the step panel, the first and second load stop panels, and the first and second side panels.

9. A vehicle utility bed system comprising:
a floor;
first and second side walls extending up from opposing sides of the floor;
a rear wall mounted for pivoting movement relative to the floor, wherein the rear wall is moveable between an upright position where the rear wall cooperates with the first and second side walls to enclose an end of a cargo bed area and an open position to allow access to the cargo bed area; and
an extender structure mounted for pivoting movement relative to the floor and which is movable between a stowed position where the extender structure is located within the floor and a deployed position where the extender structure increases a size of the cargo bed area when the rear wall is in the open position, wherein the extender structure comprises a cover panel, and wherein, when the rear wall is in the upright position, the cover panel is pivoted to an upright position to overlap the rear wall to provide a recessed area with the floor.

10. A vehicle utility bed system comprising:
a floor;
first and second side walls extending up from opposing sides of the floor;
a rear wall mounted for pivoting movement relative to the floor, wherein the rear wall is moveable between an upright position where the rear wall cooperates with the first and second side walls to enclose an end of a cargo bed area and an open position to allow access to the cargo bed area; and
an extender structure mounted for pivoting movement relative to the floor and which is movable between a stowed position where the extender structure is located within the floor and a deployed position where the extender structure increases a size of the cargo bed area when the rear wall is in the open position, wherein the extender structure comprises a cover panel, and wherein, when the rear wall is in the open position, the cover panel overlaps the rear wall to provide a generally flat work surface.

11. A vehicle utility bed system comprising:
a floor having a laterally extending width and a longitudinally extending length;
first and second side walls extending in a longitudinal direction along opposing sides of the floor;
a front wall extending in a lateral direction along a fore end of the floor;
a tailgate extending in the lateral direction along an aft end of the floor, wherein the tailgate is mounted for pivoting movement relative to the floor to move between an upright position where the tailgate cooperates with the front wall and the first and second side walls to define a cargo bed area and an open position to allow access to the cargo bed area;
a cover panel mounted for pivoting movement relative to the floor, wherein the cover panel is movable between a stowed position where the cover panel is received within a recessed area in the floor and a deployed position where the cover panel increases a size of the cargo bed area when the tailgate is in the open position; and
a step panel that is pivotally mounted to the cover panel, wherein when the tailgate is in the open position, the cover panel overlaps the tailgate and the step panel is pivoted to a step deployed position to provide a step to be used by a user to step into the cargo bed area.

12. The vehicle utility bed system of claim 11, wherein the cover panel includes a first side that faces upwardly when in the stowed position and a second side that faces downwardly when in the stowed position, and wherein the step panel fits within a recess in the first side of the cover panel when the step panel is in a step stowed position, and wherein the cover panel includes at least one load stop panel that is pivotally mounted to the second side of the cover panel and is selectively deployed to an upright position to provide a stop surface when the tailgate is in the open position.

13. The vehicle utility bed system of claim 12, wherein, when the at least one load stop panel is in the upright position, an extended bed area is provided that extends beyond rearmost ends of the first and second side walls, and wherein the cover panel further includes a first side panel that pivots to extend between the cover panel and a rearmost end of the first side wall and a second side panel that pivots to extend between the cover panel and a rearmost end of the second side wall.

14. The vehicle utility bed system of claim 13, wherein the step panel is movable to an upright position to align with the at least one load stop panel when the at least one load stop panel is in the upright position such that the extended bed area is defined with an area surrounded by the step panel, the at least one load stop panel, and the first and second side panels.

15. A vehicle utility bed system comprising:
a floor having a laterally extending width and a longitudinally extending length;
first and second side walls extending in a longitudinal direction along opposing sides of the floor;
a front wall extending in a lateral direction along a fore end of the floor;
a tailgate extending in the lateral direction along an aft end of the floor, wherein the tailgate is mounted for pivoting movement relative to the floor to move between an upright position where the tailgate cooperates with the front wall and the first and second side walls to define a cargo bed area and an open position to allow access to the cargo bed area; and a cover panel mounted for pivoting movement relative to the floor, wherein the cover panel is movable between a stowed position where the cover panel is received within a recessed area in the floor and a deployed position where the cover panel increases a size of the cargo bed area when the tailgate is in the open position, wherein, when the tailgate is in the upright position, the cover panel is pivoted to an upright position to overlap the tailgate to provide access to the recessed area within the floor, and wherein, when the tailgate is in the open position, the cover panel overlaps the tailgate to provide a generally flat work surface.

16. A method comprising:

providing a floor, first and second side walls extending up from opposing sides of the floor, and a rear wall mounted for pivoting movement relative to the floor, wherein the rear wall is moveable between an upright position where the rear wall cooperates with the first and second side walls to enclose an end of a cargo bed area and an open position to allow access to the cargo bed area;

mounting an extender structure for pivoting movement relative to the floor such that the extender structure is movable between a stowed position where the extender structure is located within the floor and a deployed position where the extender structure increases a size of the cargo bed area when the rear wall is in the open position, and wherein the extender structure comprises a cover panel and a step panel that is pivotally mounted to the cover panel;

pivoting the rear wall to the open position such that the cover panel overlaps the rear wall; and pivoting the step panel to a step deployed position to provide a step to be used by a user to step into the cargo bed area.

17. The method of claim 16, wherein the cover panel includes a first side that faces upwardly when in the stowed position and a second side that faces downwardly when in the stowed position, and including:

fitting the step panel within a recess in the first side of the cover panel when the step panel is in a step stowed position;

pivotally mounting at least one load stop panel to the second side of the cover panel;

pivoting the step panel to an upright position; and selectively deploying the at least one load stop panel to an upright position to align with the step panel and provide an extended bed area.

* * * * *